US012697642B2

(12) United States Patent
Yang et al.

(10) Patent No.: US 12,697,642 B2
(45) Date of Patent: Aug. 4, 2026

(54) SORTING SCHEDULING METHOD, APPARATUS AND MATRIX SORTING SYSTEM

(71) Applicant: ZHEJIANG GALAXIS TECHNOLOGY GROUP CO., LTD, Jiaxing (CN)

(72) Inventors: Yan Yang, Jiaxing (CN); Lu Shen, Jiaxing (CN); Chunguang Gu, Jiaxing (CN); Hongxing Bai, Jiaxing (CN); Jiaxiong Yu, Jiaxing (CN); Sha Liu, Jiaxing (CN)

(73) Assignee: ZHEJIANG GALAXIS TECHNOLOGY GROUP CO., LTD, Jiaxing (CN)

( * ) Notice: Subject to any disclaimer, the term of this patent is extended or adjusted under 35 U.S.C. 154(b) by 372 days.

(21) Appl. No.: 18/433,631

(22) Filed: Feb. 6, 2024

(65) Prior Publication Data

US 2024/0173748 A1 May 30, 2024

Related U.S. Application Data

(63) Continuation of application No. PCT/CN2022/089421, filed on Apr. 27, 2022.

(30) Foreign Application Priority Data

Sep. 3, 2021 (CN) .......................... 202111029518.4

(51) Int. Cl.
*B07C 3/08* (2006.01)
*B07C 3/00* (2006.01)
(Continued)

(52) U.S. Cl.
CPC .................. *B07C 3/08* (2013.01); *B07C 3/00* (2013.01); *B07C 5/36* (2013.01); *G06Q 10/0631* (2013.01); *G06Q 10/087* (2013.01); *B65G 1/1373* (2013.01)

(58) Field of Classification Search
CPC .... B07C 3/08; B07C 3/00; B07C 5/36; B07C 3/04; G06Q 10/0631; G06Q 10/087; B65G 1/1373
See application file for complete search history.

(56) References Cited

U.S. PATENT DOCUMENTS 6,005,211 A * 12/1999 Huang ...................... B07C 3/08
209/939
8,952,284 B1 * 2/2015 Wong ...................... G05B 15/02
209/586
(Continued)

FOREIGN PATENT DOCUMENTS

CN          109064279 A          12/2018
CN          112389916 A          2/2021
(Continued)

OTHER PUBLICATIONS

ISR of PCT/CN2022/089421, Dated Jun. 26, 2022.

*Primary Examiner* — Thomas Randazzo
(74) *Attorney, Agent, or Firm* — Hemisphere Law, PLLC

(57) ABSTRACT

The present disclosure provides a sorting scheduling method, apparatus and matrix sorting system in the field of warehousing and logistics technology, wherein the matrix sorting system includes multiple branch lines and multiple ring sorters, each branch line spans multiple ring sorters, each ring sorter is spanned by multiple branch lines, each branch line is provided with multiple sorting stations at each ring sorter, each said branch line is used to convey a stock box to the corresponding sorting station, and the sorted goods to be packaged at said sorting station flow on the (Continued)

corresponding ring sorter. The present disclosure adopts the matrix sorting form, and the order quantity completed by a sorting station can be increased dozens of times compared to the existing sorting station layout, which alleviates the problem of conveyor line blockage and realizes large-scale sorting operations.

11 Claims, 5 Drawing Sheets

(51) Int. Cl.

| | | |
|---|---|---|
| *B07C 5/36* | (2006.01) | |
| *B65G 1/137* | (2006.01) | |
| *G06Q 10/0631* | (2023.01) | |
| *G06Q 10/087* | (2023.01) | |

(56)                References Cited

U.S. PATENT DOCUMENTS

| 9,171,278 B1 * | 10/2015 | Kong | B65G 1/1373 |
|---|---|---|---|
| 2021/0008598 A1 | 1/2021 | Grupp et al. | |
| 2022/0089371 A1 * | 3/2022 | Wu | G06Q 10/087 |
| 2022/0106119 A1 * | 4/2022 | Yang | B65G 1/1373 |
| 2023/0032013 A1 * | 2/2023 | Fritzsche | B65G 37/02 |
| 2023/0331488 A1 * | 10/2023 | Della Torre | G06Q 10/08 |

FOREIGN PATENT DOCUMENTS

| CN | 112801599 A | 5/2021 |
|---|---|---|
| CN | 113469631 | 10/2021 |

* cited by examiner

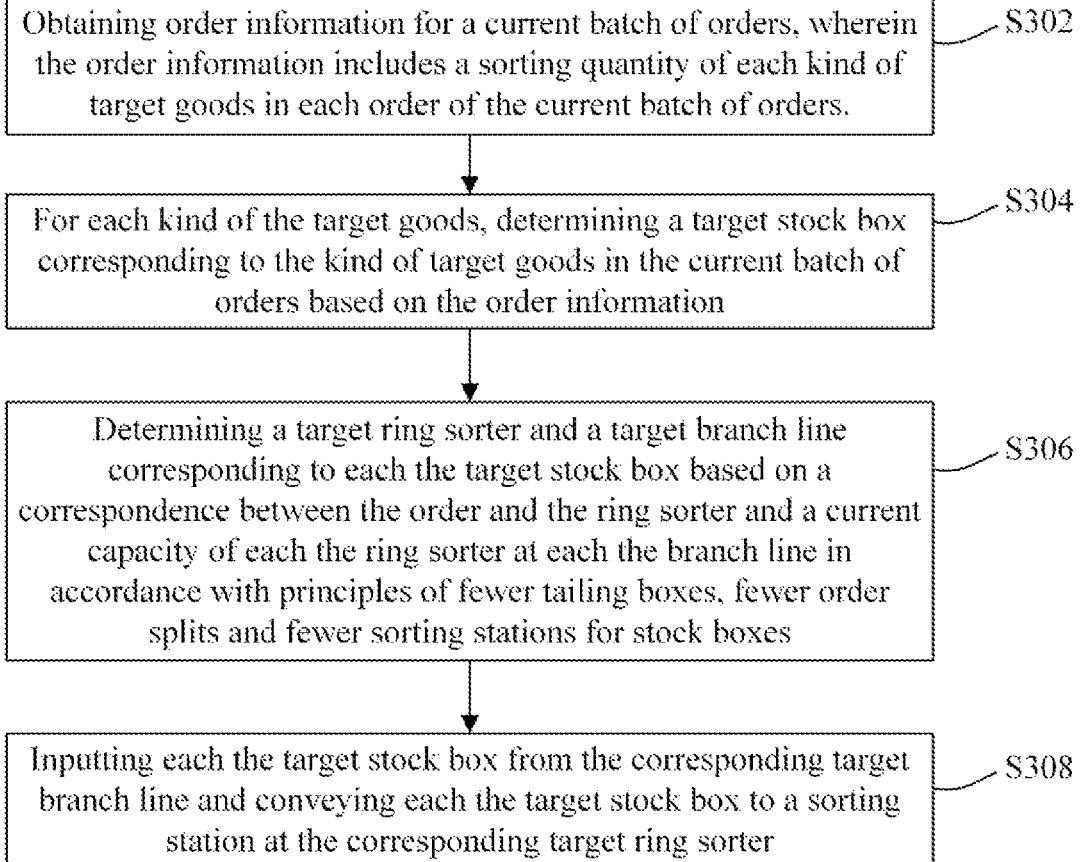

Obtaining order information for a current batch of orders, wherein the order information includes a sorting quantity of each kind of target goods in each order of the current batch of orders.    S302

For each kind of the target goods, determining a target stock box corresponding to the kind of target goods in the current batch of orders based on the order information    S304

Determining a target ring sorter and a target branch line corresponding to each the target stock box based on a correspondence between the order and the ring sorter and a current capacity of each the ring sorter at each the branch line in accordance with principles of fewer tailing boxes, fewer order splits and fewer sorting stations for stock boxes    S306

Inputting each the target stock box from the corresponding target branch line and conveying each the target stock box to a sorting station at the corresponding target ring sorter    S308

FIG. 3

SORTING SCHEDULING METHOD, APPARATUS AND MATRIX SORTING SYSTEM

TECHNICAL FIELD

The present disclosure relates to the technical field of warehousing and logistics, and in particular to a sorting scheduling method, apparatus and matrix sorting system.

BACKGROUND ART

Splitting and sorting is a common operation mode in logistics warehouses of supermarket chains, drugstores and other retail industries. In the traditional "person-to-goods" operation mode, the sorter needs to walk to the sorting area to sort the required goods, which results in a long walking distance, high labor intensity, and low operating efficiency. With the "goods-to-person" mode, goods are sent to the sorting station via an AGV (automated guided vehicle) or a conveyor line, and the sorter can complete the sorting of goods without walking, which reduces the labor intensity and improves the operating efficiency.

Existing "goods-to-person" sorting systems include a conveyor big loop connected to an outside storage area, a sorting station (i.e., a picking station), and a conveyor small loop, the sorting station has an inlet and an outlet, and the conveyor big loop and the conveyor small loop are provided between the inlet and the outlet of the sorting station, the conveyor big loop is used to convey a source box (i.e., a stock box) from the outside storage area to the inlet of the sorting station, and the conveyor small loop is used to convey a source box not matching the sorting task of the current target box from the sorting station outlet to the inlet again. In this sorting station layout, the stock boxes need to travel to multiple sorting stations, which requires frequently traveling to sorting station, which causes greater pressure on the conveyor line and is easy to cause blockage of the conveyor line, so the quantity of sorting stations cannot be too large, resulting in a limited maximum operating capacity.

SUMMARY

It is an object of the present disclosure to provide a sorting scheduling method, apparatus and matrix sorting system to alleviate conveyor line blockage and enable large-scale sorting operations.

In a first aspect, embodiments of the present disclosure provide a sorting scheduling method, the sorting scheduling method is applied to a matrix sorting system, the matrix sorting system includes multiple branch lines and multiple ring sorters, each the branch line spans multiple the ring sorters, each the ring sorter is spanned by multiple the branch lines, each the branch line is provided with multiple sorting stations at each of the ring sorters, and each the branch line is used to convey a stock box to the corresponding sorting station, and the sorted goods to be packaged at the sorting station flow on the corresponding ring sorter; and the sorting scheduling method includes:

obtaining order information for a current batch of orders, wherein the order information includes a sorting quantity of each kind of target goods in each order of the current batch of orders;

for each kind of the target goods, determining a target stock box corresponding to the kind of target goods in the current batch of orders based on the order information;

determining a target ring sorter and a target branch line corresponding to each the target stock box based on a correspondence between the order and the ring sorter and a current capacity of each the ring sorter at each the branch line in accordance with principles of fewer tailing boxes, fewer order splits and fewer sorting stations for stock boxes; and inputting each the target stock box from the corresponding target branch line and conveying each the target stock box to a sorting station at the corresponding target ring sorter.

Further, the determining a target stock box corresponding to the kind of target goods in the current batch of orders based on the order information includes:

calculating a summarized required quantity of the target goods based on a sorting quantity of the target goods in each order of the current batch of orders;

determining a quantity of outbound boxes of the target goods based on the summarized required quantity of the target goods and a quantity of the target goods in the target tailing boxes in which the target goods is stored; and determining a target stock box corresponding to the target goods based on the quantity of outbound boxes of the target goods, wherein the target stock box includes the target tailing box.

Further, the determining a target ring sorter and a target branch line corresponding to each the target stock box based on a correspondence between the order and the ring sorter and a current capacity of each the ring sorter at each the branch line, in accordance with principles of fewer tailing boxes, fewer order splits and fewer sorting stations for stock boxes includes:

determining an order corresponding to each the target box in accordance with principles of fewer tailing boxes, fewer order splits and fewer sorting stations for the stock boxes;

determining a target ring sorter corresponding to each the target box based on the order corresponding to each the target box and the correspondence between the order and the ring sorter; and determining a target branch line corresponding to each the target stock box based on the target ring sorter corresponding to each the target stock box and the current capacity of each the ring sorter at each the branch line.

Further, the determining an order corresponding to each the target box in accordance with principles of fewer tailing boxes, fewer order splits and fewer sorting stations for the stock boxes includes:

arranging each target order containing the target goods in accordance with a size of the sorting quantity, and recording each the target order as an unassigned state;

for each the target stock box, sequentially determining whether there exists a first order combination that satisfies a predetermined combination requirement in each the target order;

wherein the predetermined combination requirement is that the sum of the sorting quantities of the target goods in the the first order combination is equal to the quantity of goods in the target stock box;

determining each the target order in the first order combination to be an order corresponding to the target stock box and recording as an assigned state when the first order combination exists;

splitting and combining each the target order for each the target box in turn to obtain a second order combination when the first order combination does not exist;

wherein the sum of the sorting quantities of the target goods in the second order combination is equal to the quantity of goods in the target stock box;

determining each of the target orders in the second order combination to be an order corresponding to the target stock box and recording as an assigned state;

determining the target order in the unassigned state as an order corresponding to a remaining target stock box when there is a target order in an unassigned state.

Further, the determining a target branch line corresponding to each the target stock box based on the target ring sorter corresponding to each the target stock box and the current capacity of each the ring sorter at each the branch line includes:

for each the target stock box in turn, calculating a branch line capacity for each the branch line corresponding to the target stock box; wherein the branch line capacity for each the branch line corresponding to the target stock box is equal to the sum of the current capacities of each target ring sorter corresponding to the target stock box at the branch line; and determining, based on the branch line capacity for each the branch line corresponding to the target stock box, a target branch line corresponding to the target stock box and updating the current capacity of the target ring sorter at the target branch line.

Further, the determining, based on the branch line capacity for each the branch line corresponding to the target stock box, a target branch line corresponding to the target stock box includes:

determining a branch line with a smallest branch line capacity as a candidate branch line;

updating a branch line with the next smallest branch line capacity to the candidate branch line to be the candidate branch line when the candidate branch line does not satisfy a predetermined capacity requirement; wherein, the predetermined capacity requirement is that the current capacity of each the target ring sorter corresponding to the target stock box at the candidate branch line is less than a predetermined capacity threshold;

determining the candidate branch line to be a target branch line corresponding to the target stock box when the candidate branch line satisfies the predetermined capacity requirement.

Further, the inputting each the target stock box from the corresponding target branch line and conveying each the target stock box to a sorting station at the corresponding target ring sorter includes:

for each the target stock box, inputting the target stock box from the corresponding target branch line;

obtaining a queuing quantity of goods for each sorting station at the target ring sorter when the target stock box moves to the corresponding target ring sorter;

determining a target sorting station based on the queuing quantity of goods for each sorting station at the target ring sorter;

conveying the target stock box to the target sorting station.

Further, the determining a target sorting station based on the queuing quantity of goods for each sorting station at the target ring sorter includes:

determining a sorting station with the smallest queuing quantity of goods as a candidate sorting station;

determining the candidate sorting station as a target sorting station when the queuing quantity of goods at the candidate sorting station is less than a predetermined value;

controlling the target stock box to move to a next corresponding target ring sorter when the queuing quantity of goods at the candidate sorting station is greater than or equal to the predetermined value Further, the determining a target sorting station based on the queuing quantity of goods for each sorting station at the target ring sorter includes:

determining a sorting station with the smallest queuing quantity of goods as a candidate sorting station;

updating a sorting station with the next smallest queuing quantity of goods to the candidate sorting station to be a candidate sorting station when the candidate sorting station does not satisfy a predetermined queuing requirement; wherein, the predetermined queuing requirement is that the queuing quantity of goods at the candidate sorting station is less than a predetermined quantity threshold corresponding to the candidate sorting station;

determining the candidate sorting station as a target sorting station when the candidate sorting station satisfies the predetermined queuing requirement.

In a second aspect, embodiments of the present disclosure also provide a sorting scheduling apparatus, including a memory, a processor, the memory has stored therein a computer program operable on the processor, and the processor implements the above-described sorting scheduling method when executing the computer program In a third aspect, embodiments of the present disclosure further provide a matrix sorting system, which includes the sorting scheduling apparatus described in the second aspect, further includes multiple branch lines and multiple ring sorters, each the branch line spans each of the ring sorters, each the branch line is provided with multiple sorting stations at each of the ring sorters, each the branch line is used to convey a stock box to the corresponding sorting station, and the sorted goods to be packaged at the sorting station flow on the corresponding ring sorter.

In the sorting scheduling method, apparatus and matrix sorting system provided by embodiments of the present disclosure, the matrix sorting system includes multiple branch lines and multiple ring sorters, each the branch line spans multiple the ring sorters, each the ring sorter is spanned by multiple the branch lines, each the branch line is provided with multiple sorting stations at each of the ring sorters, and each the branch line is used to convey a stock box to the corresponding sorting station, and the sorted goods to be packaged at the sorting station flow on the corresponding ring sorter; and the sorting scheduling method includes: obtaining order information for a current batch of orders, wherein the order information includes a sorting quantity of each kind of target goods in each order of the current batch of orders; for each kind of the target goods, determining a target stock box corresponding to the kind of target goods in the current batch of orders based on the order information; determining a target ring sorter and a target branch line corresponding to each the target stock box based on a correspondence between the order and the ring sorter and a current capacity of each the ring sorter at each the branch line in accordance with principles of fewer tailing boxes, fewer order splits and fewer sorting stations for stock boxes; and inputting each the target stock box from the corresponding target branch line and conveying each the target stock box to a sorting station at the corresponding target ring sorter. In this way, using the matrix sorting form, when the quantity of goods in a stock box is greater than or equal to the target quantity required by the corresponding ring sorter, an stock box can enter the sorting station once to complete the sorting of all the orders that require the target goods at the corresponding ring sorter, and the order quantity completed by a sorting station can be increased dozens of times compared to the existing sorting station layout, which alleviates the problem of conveyor line blockage and realizes large-scale sorting operations.

DESCRIPTION OF THE ACCOMPANYING DRAWINGS

In order to more clearly illustrate the technical solutions in the specific embodiments or prior art of the present disclosure, the following will briefly introduce the accompanying drawings that need to be used in the description of the specific embodiments or prior art, and it is obvious that the accompanying drawings in the following description are some of the embodiments of the present disclosure, and for ordinary technicians in this field, other drawings can be obtained based on the drawings disclosed without creative labor.

FIG. 3 is a schematic flow diagram of a sorting scheduling method provided by an embodiment of the present disclosure;

DETAILED DESCRIPTION OF THE EMBODIMENTS

The technical solutions of the present disclosure will be clearly and completely described in the following with reference to the embodiments, and it is obvious that the described embodiments are part of the embodiments of the present disclosure and not all of the embodiments. Based on the embodiments of the disclosure, all other embodiments made by those skilled in the art without sparing any creative effort should fall within the protection scope of the disclosure.

In the existing sorting station layout of the "goods-to-person" sorting system, a large quantity of stock boxes need to flow back and travel to sorting stations on the conveyor line, resulting in blockage of the conveyor line and limited maximum operating capacity. Based on this, embodiments of the present disclosure provide a sorting scheduling method, apparatus and matrix sorting system that can alleviate the problem of blockage on the conveyor line and realize large-scale sorting operations.

To facilitate understanding of the present embodiments, a matrix sorting system disclosed in the embodiments of the present disclosure is first described in detail.

Figure 1:
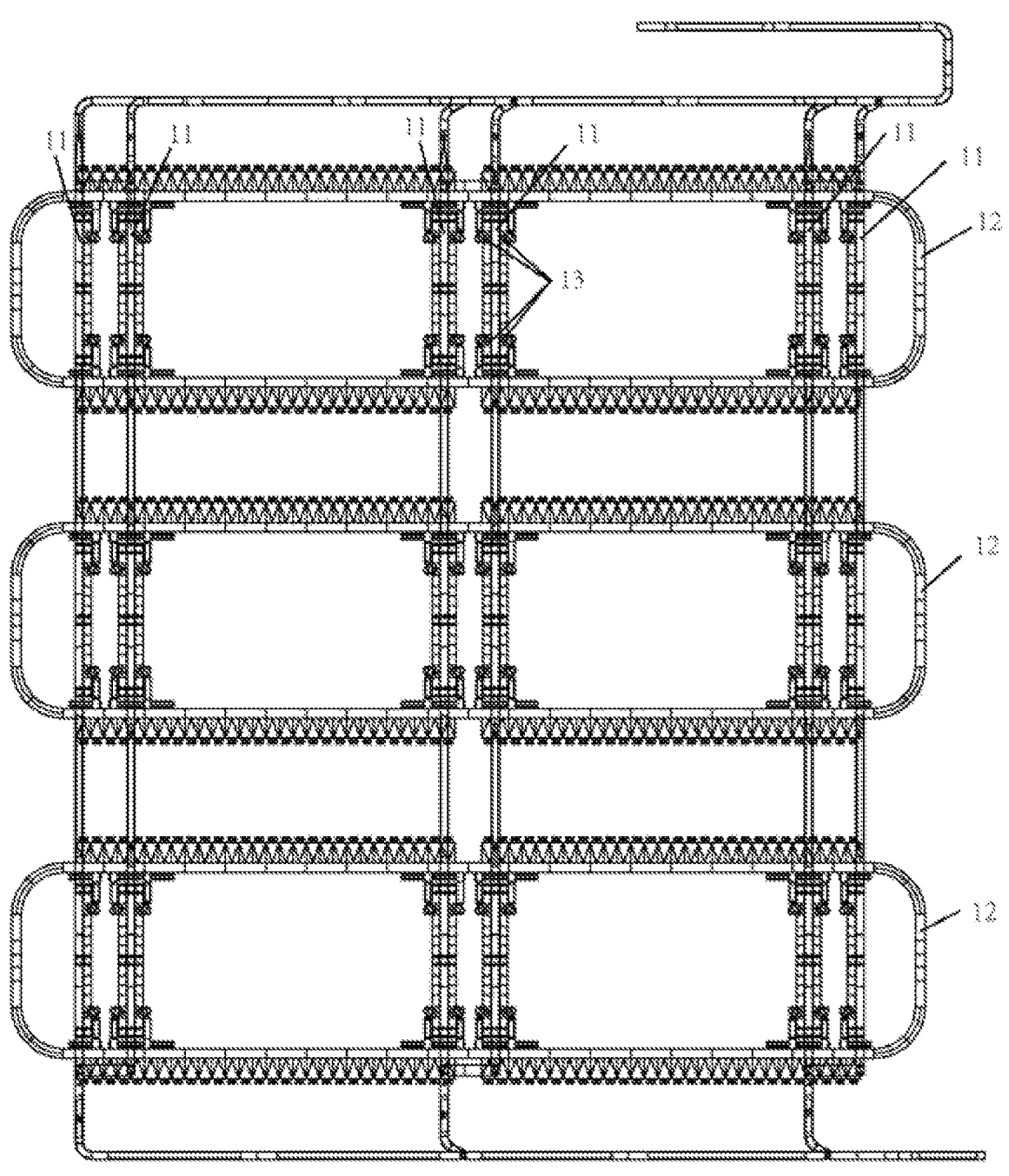
FIG. 1 shows a schematic structure of a matrix sorting system provided by an embodiment of the present disclosure.

Referring to a schematic structure of a matrix sorting system shown in FIG. 1, embodiments of the present disclosure provide a matrix sorting system including multiple branch lines 11 and multiple ring sorters 12, each the branch line 11 spans each of the ring sorters 12, each the ring sorter 12 is spanned by multiple the branch lines 11, each the branch line 11 is provided with multiple sorting stations 13 at each of the ring sorters 12, each the branch line 11 is used to convey a stock box to the corresponding sorting station 12, and the sorted goods to be packaged at the sorting station 13 flow on the corresponding ring sorter 12.

The quantity of the above-mentioned branch lines 11 and ring sorters 12 can be set according to the actual demand, for example, the matrix sorting system in FIG. 1 includes three branch lines 11 and three ring sorters 12. In the above-mentioned matrix sorting system, the stock boxes only flow on the branch lines 11, and the goods sorted by the sorting station 13 flow on the corresponding ring sorter 12, and the goods on the ring sorter 12 are sorted according to the order. The order corresponds to the ring sorter 12, and a ring sorter 12 may correspond to one order or multiple orders.

Optionally, the height of each branch line 11 is higher than the height of each ring sorter 12. This facilitates sorting at the sorting station 13.

Figure 2:
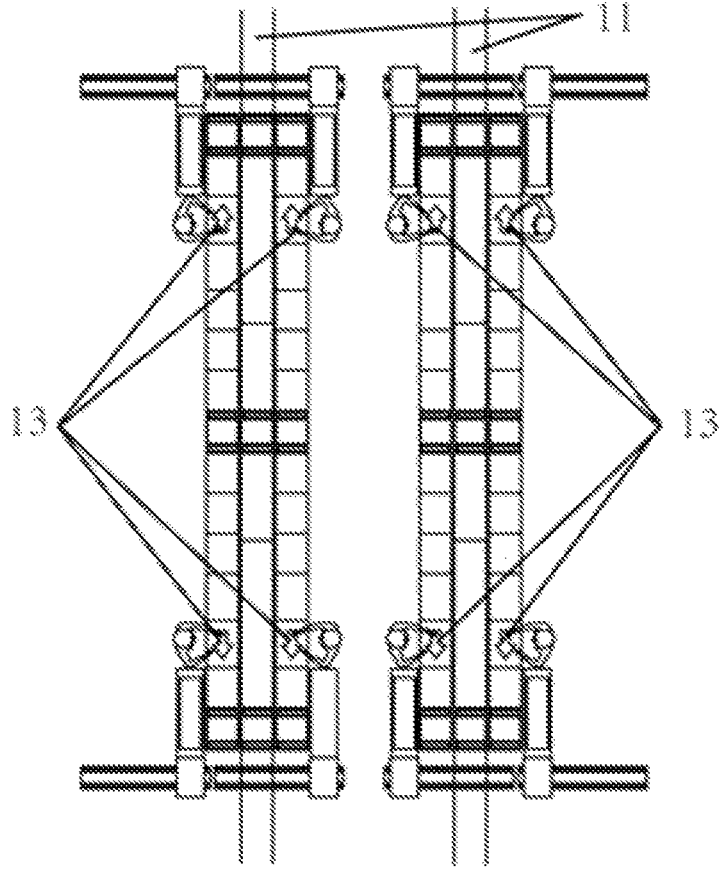
FIG. 2 shows an enlarged schematic diagram at a sorting station in the matrix sorting system shown in FIG. 1.

In one possible realization, as shown in FIG. 1, each branch line 11 may include two conveyor lines moving in opposite directions, an inbound line (high line) and an outbound line (low line), the two conveyor lines have different inlets and share the same outlet, i.e., each branch line 11 includes two inlets and one outlet; both tails of the two conveyor lines are connected, so that the stock boxes can circulate on the branch lines 11 as needed; as shown in FIG. 2, each conveyor line may have up to four sorting stations 13 at each ring sorter 12, i.e., each branch line 11 may have up to eight sorting stations 13 at each ring sorter 12.

In order to realize the sorting scheduling of the matrix sorting system, the above matrix sorting system also includes a sorting scheduling apparatus (not shown in the figure), the sorting scheduling apparatus is used to carry out the sorting scheduling of the stock box for a wave of orders, when the goods quantity in an stock box is greater than or equal to the target quantity required by the corresponding ring sorter, a single stock box can enter the sorting station 13 once to complete the sorting of all orders requiring the target goods in the stock box on the corresponding ring sorter 12.

The matrix sorting system provided by embodiments of the present disclosure adopts the form of matrix sorting, and when the goods quantity in a stock box is greater than or equal to the target quantity required by the corresponding ring sorter, an stock box enters a sorting station once to complete the sorting of all orders requiring the target goods in the stock box on the corresponding ring sorter, compared to the existing sorting station layout, the order quantity accomplished by a sorting station is increased by dozens of times as, the problem of conveyor line blockage is alleviated, and large-scale sorting operations are realized.

On the basis of the matrix sorting system described above, embodiments of the present disclosure also provide a sorting scheduling method, which may be performed by a sorting scheduling apparatus. Referring to the schematic flow diagram of a sorting scheduling method shown in FIG. 3, the method mainly includes the following steps S302 to S308.

Step S302, obtaining order information for a current batch of orders, wherein the order information includes a sorting quantity of each kind of target goods in each order of the current batch of orders.

The current batch of orders may be a wave of orders, and different orders in the current batch of orders may have the same target goods.

Step S304, for each kind of the target goods, determining a target stock box corresponding to the kind of target goods in the current batch of orders based on the order information.

In some possible embodiments, the above step S304 can be realized by the following process: calculating a summarized required quantity of the target goods based on a sorting quantity of the target goods in each order of the current batch of orders; determining a quantity of outbound boxes of the target goods based on the summarized required quantity of the target goods and a quantity of the target goods in the target tailing boxes in which the target goods is stored; and determining a target stock box corresponding to the target goods based on the quantity of outbound boxes of the target goods, wherein the target stock box includes the target tailing box.

Optionally, the quantity of outbound boxes of the target goods can be determined as follows: when goods quantity in the target tailing box is greater than or equal to the summarized required quantity of the target goods, the quantity of outbound boxes of the target goods is determined to be 1; when goods quantity in the target tailing box is less than the summarized required quantity of the target goods, the quantity of outbound boxes of the target goods is determined by the following formula: the quantity of outbound boxes of the target goods=(the summarized required quantity of the target goods−the goods quantity in the target tailing box)/the quantity of integrated boxes of the target goods [rounded up]+1.

In specific realization, the quantity of boxes that need to be sorted for each kind of target goods can be calculated according to the waves, priority will be given to the tailing box out of the warehouse, if the good quantity stored in the tailing box (i.e., the good quantity in the tailing box) is greater than or equal to the summarized required quantity of the target goods in all orders in the wave, then a tailing box is taken out of the warehouse; if the good quantity stored in the tailing box is less than the summarized required quantity of the target goods in all orders in the wave, then boxes with a quantity of (the summarized required quantity of the target goods in all orders in the wave—the goods quantity in the tailing box)/the quantity of integrated boxes of the target goods [rounded up] and the tailing box are taken out of the warehouse.

Step S306, determining a target ring sorter and a target branch line corresponding to each the target stock box based on a correspondence between the order and the ring sorter and a current capacity of each the ring sorter at each the branch line in accordance with principles of fewer tailing boxes, fewer order splits and fewer sorting stations for stock boxes.

In some possible embodiments, the above step S306 may be realized by the following sub-steps 1 to 3:
Sub-step 1, determining an order corresponding to each the target box in accordance with principles of fewer tailing boxes, fewer order splits and fewer sorting stations for the stock boxes.

This sub-step is to assign a target stock box for the order, one or more orders can be bound to a target stock box, that is, a target stock box can correspond to an order or a combination of orders composed of multiple orders, an order can also be split into two parts, respectively, bound to two target stock boxes. This can be accomplished by binding the order combination to the target stock box when the target stock box passes through a BCR (Bar Code Reader); if the stock box passing through is a tailing box, the appropriate combination of tailing box orders is selected and bound to the tailing box; if the stock box passing through is an integrated box, the appropriate combination of integrated box orders is selected and bound to the stock box.

In one possible implementation, each target order containing the target goods can be arranged in accordance with a size of the sorting quantity, and each the target order is recorded as an unassigned state; then for each the target stock box, it is sequentially determined whether there exists a first order combination that satisfies a predetermined combination requirement in each the target order; wherein the predetermined combination requirement is that the sum of the sorting quantities of the target goods in the the first order combination is equal to the quantity of goods in the target stock box; when the first order combination exists, each the target order in the first order combination is determined to be an order corresponding to the target stock box and recording as an assigned state; when the first order combination does not exist, each the target order is split and combined for each the target box in turn to obtain a second order combination; wherein the sum of the sorting quantities of the target goods in the second order combination is equal to the quantity of goods in the target stock box; each of the target orders in the second order combination is determined to be an order corresponding to the target stock box and recorded as an assigned state; when there is a target order in an unassigned state, the target order in the unassigned state is determined to be an order corresponding to a remaining target stock box.

Sub-step 2, determining a target ring sorter corresponding to each the target box based on the order corresponding to each the target box and the correspondence between the order and the ring sorter.

For example, if the orders corresponding to the target stock box 1 include order 1, order 2, and order 5, with order 1 and order 2 corresponding to ring sorter 1 and order 5 corresponding to ring sorter 3, then the target ring sorters corresponding to the target stock box 1 are ring sorter 1 and ring sorter 3.

Sub-step 3, determining a target branch line corresponding to each the target stock box based on the target ring sorter corresponding to each the target stock box and the current capacity of each the ring sorter at each the branch line.

The current capacity of a ring sorter at a branch line refers to the quantity of boxes that need to be sorted at the sorting station corresponding to that ring sorter at that branch line and for which sorting is not currently complete. For the first target box of the current wave, if all target stock boxes of the waves prior to the current wave have been sorted, then the current capacity of each ring sorter at each branch line is 0, and conversely, the current capacity of each ring sorter at each branch line is not necessarily 0.

In one possible implementation, for each the target stock box in turn, a branch line capacity for each the branch line corresponding to the target stock box is calculated; wherein the branch line capacity for each the branch line corresponding to the target stock box is equal to the sum of the current capacities of each target ring sorter corresponding to the target stock box at the branch line; then based on the branch line capacity for each the branch line corresponding to the target stock box, a target branch line corresponding to the target stock box is determined and the current capacity of the target ring sorter at the target branch line is updated.

Optionally, the target branch line corresponding to the target stock box may be determined by the following process: determining a branch line with a smallest branch line capacity as a candidate branch line; updating a branch line with the next smallest branch line capacity to the candidate branch line to be the candidate branch line when the candidate branch line does not satisfy a predetermined capacity requirement; wherein the predetermined capacity requirement is that the current capacity of each the target ring sorter corresponding to the target stock box at the candidate branch line is less than a predetermined capacity threshold; determining the candidate branch line to be a target branch line corresponding to the target stock box when the candidate branch line satisfies the predetermined capacity requirement. When all the branch lines do not meet the predetermined capacity requirement, the branch line capacity of each branch line corresponding to the target stock box is recalculated after waiting for the predetermined time, and the target branch line is re-determined. The above predetermined capacity threshold can be set according to the actual demand and is not limited here. If there are several branch lines with the same and smallest capacity, one branch line can be randomly selected as a candidate branch line; if the candidate branch line selected for the first time does not meet the predetermined capacity requirement, other branch lines with the same capacity as that of the candidate branch line will be updated as the candidate branch line.

For example, stock box A corresponds to ring sorters 1 and 2, the current capacities of ring sorters 1 and 2 at branch line 1 are 7 and 8, respectively, the current capacities of ring sorters 1 and 2 at branch line 2 are 10 and 1, respectively, the current capacities of ring sorters 1 and 2 at branch line 3 are 5 and 8, respectively, and the predetermined capacity threshold is 10, so that the capacities of the branches 1, 2 and 3 are 15, 11 and 13, respectively. Therefore, branch line 2 is first determined to be a candidate branch line; since the current capacity of the ring sorter 1 at branch line 2 (i.e., 10) is equal to the predetermined capacity threshold, branch line 3 is updated as a candidate branch line, and since the current capacity of the ring sorters 1 and 2 at branch line 3 is less than the predetermined capacity threshold, branch line 3 is determined to be a target branch line.

Step S308, inputting each the target stock box from the corresponding target branch line and conveying each the target stock box to a sorting station at the corresponding target ring sorter.

In some possible embodiments, step S308 may be accomplished by the following process: for each the target stock box, inputting the target stock box from the corresponding target branch line; obtaining a queuing quantity of goods for each sorting station at the target ring sorter when the target stock box moves to the corresponding target ring sorter; determining a target sorting station based on the queuing quantity of goods for each sorting station at the target ring sorter; and conveying the target stock box to the target sorting station.

In one possible implementation, the target sorting station may be determined by the following process: determining a sorting station with the smallest queuing quantity of goods as a candidate sorting station; updating a sorting station with the next smallest queuing quantity of goods to the candidate sorting station to be a candidate sorting station when the candidate sorting station does not satisfy a predetermined queuing requirement; wherein, the predetermined queuing requirement is that the queuing quantity of goods at the candidate sorting station is less than a predetermined quantity threshold corresponding to the candidate sorting station; determining the candidate sorting station as a target sorting station when the candidate sorting station satisfies the predetermined queuing requirement; and when all the sorting stations do not satisfy the predetermined queuing requirement, the target stock box is controlled to move to the next corresponding target ring sorter. Different sorting stations may correspond to different predetermined quantity thresholds, and the relationship between the sorting stations and the predetermined quantity thresholds may be set according to the actual needs, and is not limited herein.

In another possible implementation, a target sorting station may be determined by the following process: determining a sorting station with the smallest queuing quantity of goods as a candidate sorting station; determining the candidate sorting station as a target sorting station when the queuing quantity of goods at the candidate sorting station is less than a predetermined value; controlling the target stock box to move to a next corresponding target ring sorter when the queuing quantity of goods at the candidate sorting station is greater than or equal to the predetermined value. The predetermined value can be set according to actual needs, and is not limited herein.

When specifically realized, taking the two conveyor lines of a branch line shown in FIG. 2 with four picking stations at each ring sorter as an example, each conveyor line is also provided with a judgment point at each ring sorter, i.e., a judgment point corresponds to four sorting stations, assuming that the maximum buffer volume (i.e., the predetermined value) of the sorting station is Q, and the current buffer volume (i.e., the queuing quantity of goods) of the four sorting stations is $q_i$ (i=1, 2, 3, 4), the ring sorter to which they belong is s, and when the target stock box reaches the judgment point, the judgment logic of choosing whether or not to enter the sorting station is as follows:

1) determining whether the target stock box needs to enter the current ring sorter (i.e., determining whether the current ring sorter is s); if not, then proceeding straight; if so, then proceeding to 2).

2) selecting a sorting station with the smallest current buffer volume, that is, the one corresponding to min $(q_1,q_2,q_3,q_4)$, and determining whether the current buffer volume of this sorting station is smaller than the maximum buffer volume Q; if so, entering; if not, proceeding straight.

After the sorting is completed, the target stock box returns from the target sorting station to the target branch line and goes to the target sorting station at the next target ring sorter until all the orders bound to the target stock box have been sorted.

The embodiment of the present disclosure provides a sorting scheduling method that adopts the form of matrix sorting, so that when the goods quantity in a stock box is greater than or equal to the target quantity required by the corresponding ring sorter, an stock box can enter a sorting station once to complete the sorting of all the orders that require the target goods at the corresponding ring sorter, and the order quantity completed by a sorting station can be increased dozens of times compared to the existing sorting station layout, which alleviates the problem of conveyor line blockage and realizes large-scale sorting operations.

Figure 4:
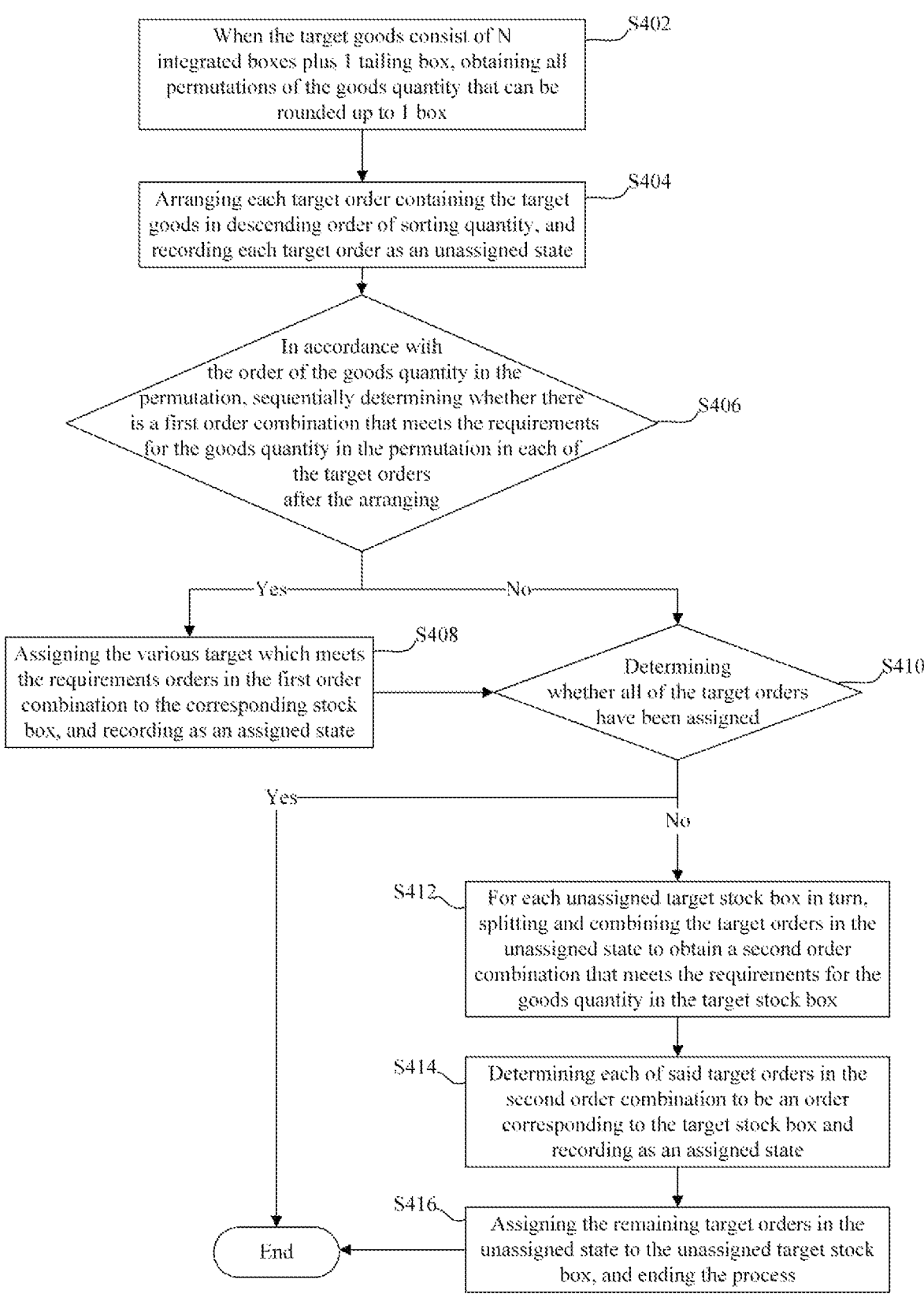
FIG. 4 is a flowchart of assigning a stock box to an order in a sorting scheduling method provided by an embodiment of the present disclosure.

For ease of understanding, referring to FIG. 4 for an illustration of the process of assigning stock boxes to an order in a sorting scheduling method, and the steps of assigning stock boxes to orders are as follows:

Step S402, when the target goods consist of N integrated boxes plus 1 tailing box, obtaining all permutations of the goods quantity that can be rounded up to 1 box.

For example, if the quantity of integrated boxes is 10, the quantity of boxes in an integrated box is 2 boxes, and the goods quantity in a tailing box is 5, then the possible combinations are just as good as a tailing box, or 1 box of integrated box, or 1 tailing box plus 1 box of integrated box, or 2 boxes of integrated boxes, or a tailing box plus 2 boxes of integrated box in a permutation of [5, 10, 15, 20, 25].

Step S404, arranging each target order containing the target goods in descending order of sorting quantity, and recording each target order as an unassigned state.

Step S406, in accordance with the order of the goods quantity in the permutation, sequentially determining whether there is a first order combination that meets the requirements for the goods quantity in the permutation in each of the target orders after the arranging. If so, performing step S408; if not, performing step S410.

Step S408, assigning the various target which meets the requirements orders in the first order combination to the corresponding stock box, and recording as an assigned state. Then, performing step S410.

Step S410, determining whether all of the target orders have been assigned. If so, ending the process; if not, performing step S412.

Step S412, for each unassigned target stock box in turn, splitting and combining the target orders in the unassigned state to obtain a second order combination that meets the requirements for the goods quantity in the target stock box.

Step S414, determining each of the target orders in the second order combination to be an order corresponding to the target stock box and recording as an assigned state.

Step S416, assigning the remaining target orders in the unassigned state to the unassigned target stock box, and ending the process.

After step S414, there may still be target orders in unassigned state, which may be one or more target orders, and the goods quantity corresponding to this target order does not meet the goods quantity in the target stock box, so it is sufficient to directly assign this target order to the unassigned target stock box, which will form a new tailing box.

Table 1 below shows the orders that need to be sorted in this wave for the goods with SKU (stock keeping unit) of 1. The following is an example of the order shown in Table 1 to illustrate the process of assigning stock boxes to the order in FIG. 4 above.

TABLE 1

| Order No. | Ring sorter No. | SKU | Sorting quantity | Assigned or not |
|---|---|---|---|---|
| 1 | 1 | 1 | 10 | no |
| 2 | 1 | 1 | 5 | no |
| 3 | 2 | 1 | 10 | no |
| 4 | 2 | 1 | 2 | no |
| 5 | 3 | 1 | 3 | no |
| 6 | 3 | 1 | 5 | no |
| 7 | 3 | 1 | 2 | no |

Assuming that the quantity of integrated boxes is 18 and the quantity of tailing boxes is 6, the quantity of outbound boxes is 1+(37−6)/18 (rounded up)=3 boxes, corresponding to the goods quantity in the stock boxes being 6, 18, and 18, respectively.

a. Table 1 is arranged in accordance with the sorting quantity from large to small, and ring sorter number from small to large, to obtain the following table 2.

TABLE 2

| Order No. | Ring sorter No. | SKU | Sorting quantity | Assigned or not |
|---|---|---|---|---|
| 1 | 1 | 1 | 10 | no |
| 3 | 2 | 1 | 10 | no |
| 2 | 1 | 1 | 5 | no |
| 6 | 3 | 1 | 5 | no |

TABLE 2-continued

| Order No. | Ring sorter No. | SKU | Sorting quantity | Assigned or not |
|---|---|---|---|---|
| 5 | 3 | 1 | 3 | no |
| 4 | 2 | 1 | 2 | no |
| 7 | 3 | 1 | 2 | no | b. Table 2 is searched from top to bottom, sequentially, to combine orders that have not been assigned a stock box, and the combined order sort quantities add up to 18 or 6.

c. When assigning the first tailing box, a combination of orders that just rounds up is not found, then it is skipped first.

d. Orders 1, 2, and 5 can be assigned to the first integrated box (i.e., stock box 1), through the ring sorter 1, 3, which is turned into an empty box through ring sorter 1 and 3, and column 5 is changed to assigned, as shown in Table 3 below.

TABLE 3

| Order No. | Ring sorter No. | SKU | Sorting quantity | Assigned or not | Stock box No. |
|---|---|---|---|---|---|
| 1 | 1 | 1 | 10 | no | 1 |
| 3 | 2 | 1 | 10 | no | 3 |
| 2 | 1 | 1 | 5 | no | 1 |
| 6 | 3 | 1 | 5 | no | 2 |
| 5 | 3 | 1 | 3 | no | 1 |
| 4 | 2 | 1 | 1 | no | 2 |
| 4 | 2 | 1 | 1 | no | 3 |
| 7 | 3 | 1 | 2 | no | 3 | e. When assigning the second integrated box, if no order combination is found that just rounds up, then it is skipped first.

f. It is checked that not all orders have been assigned.

g. The first tailing box assignment is continued, order 6 and order 4 are assigned to the tailing box (i.e., stock box 2), and after passing through ring sorter 2 and 3, the sorting quantity of order 4 is 1 completed, and 1 to be completed.

h. The second integrated box assignment is continued, order 3, 4, and 7 are assigned to the second integrated box (i.e., stock box 3), and after passing through the ring sorter 2 and 3, the remaining goods quantity in the second integrated box is 5, which form a new tailing box, as shown in Table 3.

i. It is checked that not all orders have been assigned, and the process is ended.

Table 3 above is arranged by box number to obtain the following Table 4. And Table 5 below shows the current capacity of each ring sorter at different branches, and the time point for updating Table 5 includes the time after the stock box has passed the BCR to determine the target branch line and the time after the stock box has finished sorting at the sorting station. Taking Table 4 and Table 5 as examples, the process of determining the target branch line will be explained in detail below

TABLE 4

| Order No. | Ring sorter No. | SKU | Sorting quantity | Assigned or not | Stock box No. |
|---|---|---|---|---|---|
| 1 | 1 | 1 | 10 | no | 1 |
| 2 | 1 | 1 | 5 | no | 1 |

TABLE 4-continued

| Order No. | Ring sorter No. | SKU | Sorting quantity | Assigned or not | Stock box No. |
|---|---|---|---|---|---|
| 5 | 3 | 1 | 3 | no | 1 |
| 6 | 3 | 1 | 5 | no | 2 |
| 4 | 2 | 1 | 1 | no | 2 |
| 4 | 2 | 1 | 1 | no | 3 |
| 3 | 2 | 1 | 10 | no | 3 |
| 7 | 3 | 1 | 2 | no | 3 |

TABLE 5

| Branch line No. | Ring sorter No. | Capacity |
|---|---|---|
| 1 | 1 | 5 |
| 1 | 2 | 5 |
| 1 | 3 | 3 |
| 2 | 1 | 4 |
| 2 | 2 | 8 |
| 2 | 3 | 3 |
| 3 | 1 | 2 |
| 3 | 2 | 10 |
| 3 | 3 | 4 | a. Stock box 2 is the tailing box, as shown in Table 4, the tailing box corresponds to order 6, 4, and it is determined that the tailing box needs to go to the ring sorter 2 and 3; as shown in Table 5, the tailing box corresponds to the branch line capacity of the three branch lines (i.e., the sum of the capacity of the ring sorter 2 and 3) are 8, 11, 14, respectively, the branch line 1 with the smallest branch line capacity is selected as the target branch line corresponding to the tailing box, that is, the tailing box is bound to the branch line 1 and the capacity of branch line 1 corresponding to Table 5 is updated plus 1 to get the updated Table 6.

TABLE 6

| Branch line No. | Ring sorter No. | Capacity |
|---|---|---|
| 1 | 1 | 5 |
| 1 | 2 | 6 |
| 1 | 3 | 4 |
| 2 | 1 | 4 |
| 2 | 2 | 8 |
| 2 | 3 | 3 |
| 3 | 1 | 2 |
| 3 | 2 | 10 |
| 3 | 3 | 4 | b. The integrated box passes through, as shown in Table 4, the stock box 1 goes to ring sorter 1 and 3, and the stock box 3 goes to ring sorter 2 and 3; as shown in Table 6, the capacity of the three branch lines corresponding to the stock box 1 (i.e., the sum of the capacity of the ring sorter 1 and 3) is 9, 7, 6, respectively, and the capacity of the three branch lines corresponding to the stock box 3 (the sum of the capacity of ring sorter 2 and 3) is 10, 11, 14, respectively, so that the branch line 3 with the smallest branch line capacity is selected as the target branch line corresponding to the stock box 1, that is, the stock box 1 is bound to the branch line 3, and the capacities of the ring sorter 1 and 3 corresponding to the branch line 1 in Table 6 are updated plus 1 to obtain the updated Table 7.

TABLE 7

| Branch line No. | Ring sorter No. | Capacity |
|---|---|---|
| 1 | 1 | 5 |
| 1 | 2 | 6 |
| 1 | 3 | 4 |
| 2 | 1 | 4 |
| 2 | 2 | 8 |
| 2 | 3 | 3 |
| 3 | 1 | 3 |
| 3 | 2 | 10 |
| 3 | 3 | 5 | c. For stock box 3, as shown in Table 7, the capacity of the three branch lines corresponding to stock box 3 are 10, 11, and 15, respectively, and the branch line 1 with the smallest branch capacity is selected as the target branch line corresponding to stock box 3, that is, the stock box 3 is bound to the branch line 1, and the capacities of the ring sorters 2 and 3 corresponding to the branch 1 in Table 7 are updated plus 1 to obtain updated Table 8.

TABLE 8

| Branch line No. | Ring sorter No. | Capacity |
|---|---|---|
| 1 | 1 | 5 |
| 1 | 2 | 7 |
| 1 | 3 | 5 |
| 2 | 1 | 4 |
| 2 | 2 | 8 |
| 2 | 3 | 3 |
| 3 | 1 | 3 |
| 3 | 2 | 10 |
| 3 | 3 | 5 |

In this way, a target branch line is determined for each stockpile box. This determination of the target branch line takes into account the current capacity of each ring sorter at different branch lines, which allows the stock boxes to be accessed from the most appropriate branch line.

Figure 5:
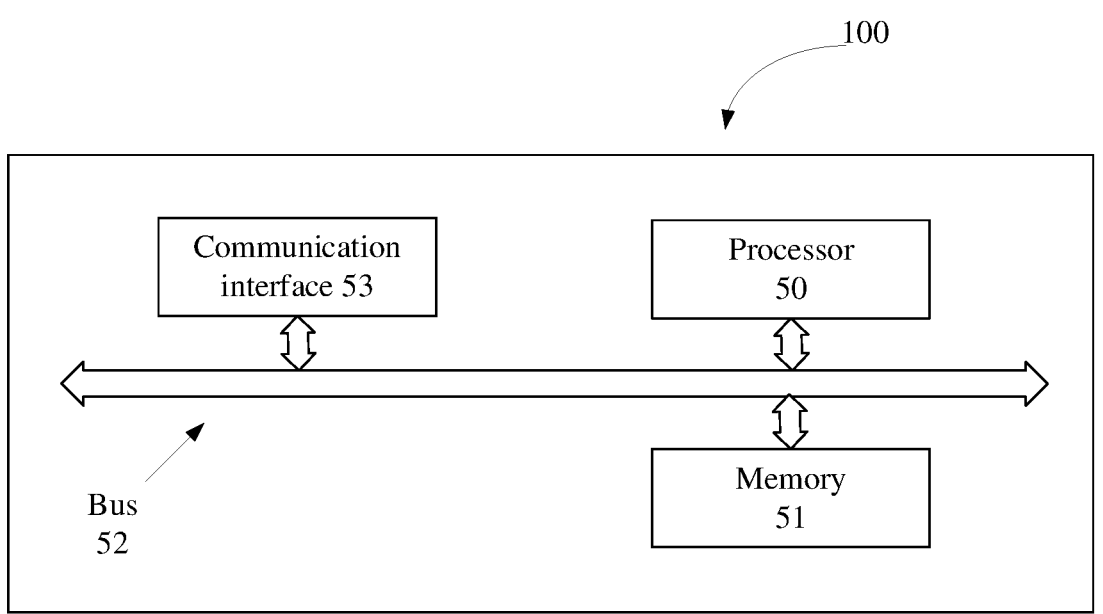
FIG. 5 shows a schematic diagram of a structure of a sorting scheduling apparatus provided by an embodiment of the present disclosure.

Referring to FIG. 5, embodiments of the present disclosure also provide a sorting scheduling apparatus 100, including: a processor 50, a memory 51, a bus 52 and a communication interface 53, the processor 50, the communication interface 53 and the memory 51 are connected via the bus 52; the processor 50 is used to execute an executable module, such as a computer program, stored in the memory 51.

Wherein, the memory 51 may include random access memory (RAM), or may also include non-volatile memory (NVM), such as at least one disk memory. A communication connection between the system network element and at least one other network element is realized through at least one communication interface 53 (which may be wired or wireless), which may use the Internet, a wide area network, a local network, a metropolitan area network, etc.

The bus 52 may be an industry standard architecture (ISA) bus, a peripheral component interconnect (PCI) bus or an extended industry standard architecture (EISA) bus. These buses can be categorized as address buses, data buses, control buses, etc. For ease of representation, FIG. 5 shows only one bi-directional arrow, but does not indicate that there is only one bus or one type of bus.

Wherein, the memory 51 is used to store a program, the processor 50 executes the program after receiving an instruction to execute the program, the method executed by the apparatus defined by the flow disclosed by any of the above embodiments of the disclosure may be applied to the processor 50 or implemented by the processor 50

The processor 50 may be an integrated circuit chip with signal processing capabilities. In the implementation, the steps of the method described above may be accomplished by integrated logic circuits in hardware or instructions in software form in the processor 50. The above processor 50 may be a general-purpose processor, including a central processing unit (CPU), network processor (NP), etc.; it may also be a digital signal processing (DSP), application specific integrated circuit (ASIC), field-programmable gate array (FPGA) or other programmable logic device, discrete component gate or transistor logic component, or discrete hardware component. It may implement or perform the various methods, steps, and logic block diagrams disclosed in the embodiments of the present application. The general-purpose processor may be a microprocessor or the processor may be any conventional processor, etc. The steps of the method disclosed in connection with embodiments of the present disclosure may be performed directly by a hardware decoder processor or by a combination of hardware and software module in a decoder processor. The software module may be 1 located in mature storage media in this field, such as random access memory, flash memory, read-only memory, programmable read-only memory, or electrically erasable programmable memory, registers, etc. The storage medium is located in memory 51, and the processor 50 reads the information in memory 51 and performs the steps of the method described above in combination with its hardware.

Embodiments of the present disclosure also provide a computer readable storage medium, on which a computer program is stored, and the computer program is run by a processor to execute the sorting scheduling method described in the preceding method embodiments. The computer readable storage medium includes a USB flash drive, a removable hard disk, a read-only memory (ROM), a RAM, a diskette, or a CD-ROM, and various other media that can store program code.

In all of the examples illustrated and described herein, any specific values should be interpreted as merely exemplary and not as limitations, and thus other examples of the exemplary embodiments may have different values.

The flowcharts and block diagrams in the accompanying drawings show the architecture, functionality and operation of systems, methods and computer program products that may be implemented in accordance with various embodiments of the present disclosure. In this regard, each box in the flowcharts or block diagrams may represent a module, program segment, or portion of code, the module, program segment, or portion of code include one or more executable instructions for carrying out a specified logical function. It should also be noted that in some implementations as replacements, the functions indicated in the boxes may also occur in a different order than that indicated in the drawings. For example, two consecutive boxes may actually be executed in essentially parallel, or they may sometimes be executed in reverse order, depending on the function involved. It should also be noted that each box in the block diagram and/or flowchart, and combinations of boxes in the block diagram and/or flowchart, may be implemented with a specialized hardware-based system that performs the specified function or action, or may be implemented with a combination of specialized hardware and computer instructions.

Finally, it should be noted that the above embodiments are only used to illustrate the technical solutions of the present disclosure, not to limit them; although the present disclosure has been described in detail with reference to the foregoing embodiments, a person of ordinary skill in the art should understand that he or she may still modify the technical solutions recorded in the foregoing embodiments, or make equivalent substitutions for some or all of the technical features therein; and such modifications or substitutions do not take the essence of the corresponding technical solutions out of the scope of the technical solutions of the embodiments of the present disclosure.

What is claimed is:

1. A sorting scheduling method, characterized in that said sorting scheduling method is applied to a matrix sorting system, said matrix sorting system comprises a plurality of branch lines and a plurality of ring sorters, each said branch line spans a plurality of said ring sorters, each said ring sorter is spanned by a plurality of said branch lines, each said branch line is provided with a plurality of sorting stations at each of said ring sorters, and each said branch line is used to convey a stock box to the corresponding sorting station, and the sorted goods to be packaged at said sorting station flow on the corresponding ring sorter; and said sorting scheduling method comprises:

obtaining order information for a current batch of orders, wherein said order information comprises a sorting quantity of each kind of target goods in each order of said current batch of orders;

for each kind of said target goods, determining a target stock box corresponding to said kind of target goods in said current batch of orders based on said order information;

determining a target ring sorter and a target branch line corresponding to each said target stock box based on a correspondence between the order and the ring sorter and a current capacity of each said ring sorter at each said branch line in accordance with principles of fewer tailing boxes, fewer order splits and fewer sorting stations for stock boxes; and inputting each said target stock box from the corresponding target branch line and conveying each said target stock box to a sorting station at the corresponding target ring sorter.

2. The sorting scheduling method according to claim 1, characterized in that said determining a target stock box corresponding to said kind of target goods in said current batch of orders based on said order information comprises:

calculating a summarized required quantity of the target goods based on a sorting quantity of the target goods in each order of said current batch of orders;

determining a quantity of outbound boxes of the target goods based on the summarized required quantity of the target goods and a quantity of the target goods in the target tailing boxes in which the target goods is stored; and determining a target stock box corresponding to the target goods based on the quantity of outbound boxes of the target goods, wherein said target stock box comprises said target tailing box.

3. The sorting scheduling method according to claim 1, characterized in that said determining a target ring sorter and a target branch line corresponding to each said target stock box based on a correspondence between the order and the ring sorter and a current capacity of each said ring sorter at each said branch line, in accordance with principles of fewer tailing boxes, fewer order splits and fewer sorting stations for stock boxes comprises:

determining an order corresponding to each said target box in accordance with principles of fewer tailing boxes, fewer order splits and fewer sorting stations for the stock boxes;

determining a target ring sorter corresponding to each said target box based on the order corresponding to each said target box and the correspondence between the order and the ring sorter; and determining a target branch line corresponding to each said target stock box based on the target ring sorter corresponding to each said target stock box and the current capacity of each said ring sorter at each said branch line.

4. The sorting scheduling method according to claim 3, characterized in that said determining an order corresponding to each said target box in accordance with principles of fewer tailing boxes, fewer order splits and fewer sorting stations for the stock boxes comprises:

arranging each target order containing the target goods in accordance with a size of the sorting quantity, and recording each said target order as an unassigned state;

for each said target stock box, sequentially determining whether there exists a first order combination that satisfies a predetermined combination requirement in each said target order;

wherein said predetermined combination requirement is that the sum of the sorting quantities of the target goods in the said first order combination is equal to the quantity of goods in the target stock box;

determining each said target order in said first order combination to be an order corresponding to the target stock box and recording as an assigned state when said first order combination exists;

splitting and combining each said target order for each said target box in turn to obtain a second order combination when said first order combination does not exist; wherein the sum of the sorting quantities of the target goods in said second order combination is equal to the quantity of goods in the target stock box;

determining each of said target orders in said second order combination to be an order corresponding to the target stock box and recording as an assigned state;

determining said target order in the unassigned state to be an order corresponding to a remaining target stock box when there is a target order in an unassigned state.

5. The sorting scheduling method according to claim 3, characterized in that said determining a target branch line corresponding to each said target stock box based on the target ring sorter corresponding to each said target stock box and the current capacity of each said ring sorter at each said branch line comprises:

for each said target stock box in turn, calculating a branch line capacity for each said branch line corresponding to the target stock box; wherein the branch line capacity for each said branch line corresponding to the target stock box is equal to the sum of the current capacities of each target ring sorter corresponding to the target stock box at the branch line; and determining, based on the branch line capacity for each said branch line corresponding to the target stock box, a target branch line corresponding to the target stock box and updating the current capacity of said target ring sorter at said target branch line.

6. The sorting scheduling method according to claim 5, characterized in that said determining, based on the branch line capacity for each said branch line corresponding to the target stock box, a target branch line corresponding to the target stock box comprises:

determining a branch line with a smallest branch line capacity as a candidate branch line;

updating a branch line with the next smallest branch line capacity to said candidate branch line to be the candidate branch line when said candidate branch line does not satisfy a predetermined capacity requirement; wherein, said predetermined capacity requirement is that the current capacity of each said target ring sorter corresponding to the target stock box at said candidate branch line is less than a predetermined capacity threshold;

determining said candidate branch line to be a target branch line corresponding to the target stock box when said candidate branch line satisfies said predetermined capacity requirement.

7. The sorting scheduling method according to claim 1, characterized in that said inputting each said target stock box from the corresponding target branch line and conveying each said target stock box to a sorting station at the corresponding target ring sorter comprises:

for each said target stock box, inputting the target stock box from the corresponding target branch line;

obtaining a queuing quantity of goods for each sorting station at said target ring sorter when the target stock box moves to the corresponding target ring sorter;

determining a target sorting station based on the queuing quantity of goods for each sorting station at said target ring sorter;

conveying the target stock box to said target sorting station.

8. The sorting scheduling method according to claim 7, characterized in that said determining a target sorting station based on the queuing quantity of goods for each sorting station at said target ring sorter comprises:

determining a sorting station with the smallest queuing quantity of goods as a candidate sorting station;

determining said candidate sorting station as a target sorting station when the queuing quantity of goods at said candidate sorting station is less than a predetermined value;

controlling said target stock box to move to a next corresponding target ring sorter when the queuing quantity of goods at said candidate sorting station is greater than or equal to said predetermined value.

9. The sorting scheduling method according to claim 7, characterized in that said determining a target sorting station based on the queuing quantity of goods for each sorting station at said target ring sorter comprises:

determining a sorting station with the smallest queuing quantity of goods as a candidate sorting station;

updating a sorting station with the next smallest queuing quantity of goods to said candidate sorting station to be a candidate sorting station when said candidate sorting station does not satisfy a predetermined queuing requirement; wherein, said predetermined queuing requirement is that the queuing quantity of goods at said candidate sorting station is less than a predetermined quantity threshold corresponding to said candidate sorting station;

determining said candidate sorting station as a target sorting station when said candidate sorting station satisfies said predetermined queuing requirement.

10. A sorting scheduling apparatus, comprising a memory, a processor, said memory having stored therein a computer program operable on said processor, characterized in that said processor implements the method described in claim 1 when executing said computer program.

11. A matrix sorting system, characterized in that it comprises the sorting scheduling apparatus of claim 10, further comprises a plurality of branch lines and a plurality of ring sorters, each said branch line spans each of said ring sorters, each said branch line is provided with a plurality of sorting stations at each of said ring sorters, each said branch line is used to convey a stock box to the corresponding sorting station, and the sorted goods to be packaged at said sorting station flow on the corresponding ring sorter.

\*    \*    \*    \*    \*